US012072466B1

(12) United States Patent
McMichael et al.

(10) Patent No.: US 12,072,466 B1
(45) Date of Patent: Aug. 27, 2024

(54) DETECTING DARK OBJECTS IN STRAY LIGHT HALOS

(71) Applicant: Zoox, Inc., Foster City, CA (US)

(72) Inventors: Ryan McMichael, San Francisco, CA (US); Robert Nicholas Moor, San Mateo, CA (US); Sasidhar Saladi, Fremont, CA (US); Haiming Wang, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 384 days.

(21) Appl. No.: 17/491,306

(22) Filed: Sep. 30, 2021

(51) Int. Cl.
| | |
|---|---|
| *G01V 8/20* | (2006.01) |
| *B60W 30/00* | (2006.01) |
| *B60W 40/02* | (2006.01) |
| *G01S 17/931* | (2020.01) |
| *G02B 27/10* | (2006.01) |

(52) U.S. Cl.
CPC .............. *G01V 8/20* (2013.01); *B60W 30/00* (2013.01); *B60W 40/02* (2013.01); *G01S 17/931* (2020.01); *G02B 27/1013* (2013.01); *B60W 2420/408* (2024.01)

(58) Field of Classification Search
CPC ........ G01V 8/20; G01S 17/931; B60W 30/00; B60W 40/02; B60W 2420/52; G02B 27/1013
See application file for complete search history.

(56) References Cited

U.S. PATENT DOCUMENTS

| | | | | |
|---|---|---|---|---|
| 3,860,818 A | * | 1/1975 | Stalder .................... | G01N 21/85 250/573 |
| 11,372,200 B2 | * | 6/2022 | Sugiyama .......... | G02B 27/4255 |
| 2007/0291798 A1 | * | 12/2007 | Kenny ............... | G02B 21/0032 359/368 |
| 2010/0301214 A1 | * | 12/2010 | Jonsson ............. | G01N 21/3518 250/332 |
| 2013/0222603 A1 | * | 8/2013 | Agranov ............... | H04N 25/135 348/164 |
| 2014/0194748 A1 | * | 7/2014 | Yamamoto ............. | A61B 5/489 600/473 |

(Continued)

FOREIGN PATENT DOCUMENTS

| | | | | |
|---|---|---|---|---|
| CN | 104520146 A | * | 4/2015 | .......... B60Q 1/0023 |
| CN | 20160022633 A | * | 4/2015 | |

(Continued)

*Primary Examiner* — Edmond C Lau
*Assistant Examiner* — Jarreas Underwood
(74) *Attorney, Agent, or Firm* — Lee & Hayes, P.C.

(57) ABSTRACT

Systems and techniques for detecting feature(s) and object(s) partially or completely obscured by stray light effects in the visible light spectrum are discussed herein. Non-visible light can be emitted from emitters. Light from an environment including visible and non-visible light can be captured at a sensing system via a lens system. The sensing system can filter the captured light using a dual band-pass filter to direct certain non-visible and visible light spectra to a beam splitter that then directs the non-visible light to a non-visible light sensor and the visible light to a visible light sensor. The sensor data generated by the non-visible light sensor can then be used to identify and classify feature(s) and object(s) that may be obscured by stray light effects in the data generated by the visible light sensor.

11 Claims, 6 Drawing Sheets

(56) References Cited

U.S. PATENT DOCUMENTS

| | | | |
|---|---|---|---|
| 2015/0312455 A1* | 10/2015 | Venkataraman | H04N 25/6153 |
| | | | 348/340 |
| 2015/0379361 A1* | 12/2015 | Boulanger | H04N 23/11 |
| | | | 701/2 |
| 2016/0117554 A1* | 4/2016 | Kang | H04N 23/74 |
| | | | 348/78 |
| 2019/0254515 A1* | 8/2019 | Zhang | A61B 3/0008 |
| 2019/0306407 A1* | 10/2019 | Ely | H04N 23/54 |
| 2020/0249428 A1* | 8/2020 | Sugiyama | H04N 23/671 |
| 2020/0284883 A1* | 9/2020 | Ferreira | G01S 7/4816 |
| 2021/0333371 A1* | 10/2021 | Pacala | G01S 7/4816 |

FOREIGN PATENT DOCUMENTS

| | | | | |
|---|---|---|---|---|
| CN | 113077482 B | * | 1/2024 | G06T 5/009 |
| DE | 102021002011 A1 | * | 8/2021 | |
| JP | 2005159710 A | * | 6/2005 | |

* cited by examiner

DETECTING DARK OBJECTS IN STRAY LIGHT HALOS

BACKGROUND

Sensors may not be able to reliably detect objects and features proximate to a light source in an environment in various lighting conditions due to stray light effects associated with the light emitted by an environmental light source. These stray light effects may include light scattering and flaring caused by optical surfaces through which a sensor may detect light emitted from the environmental light source. Such stray light effects may result in the detection of a "halo" of light surrounding the environmental light source that obscures nearby features and/or objects. Such shortcomings may result in unreliable data, increased processing time to better understand the data, and/or decreased efficiency in identifying and/or characterizing objects that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
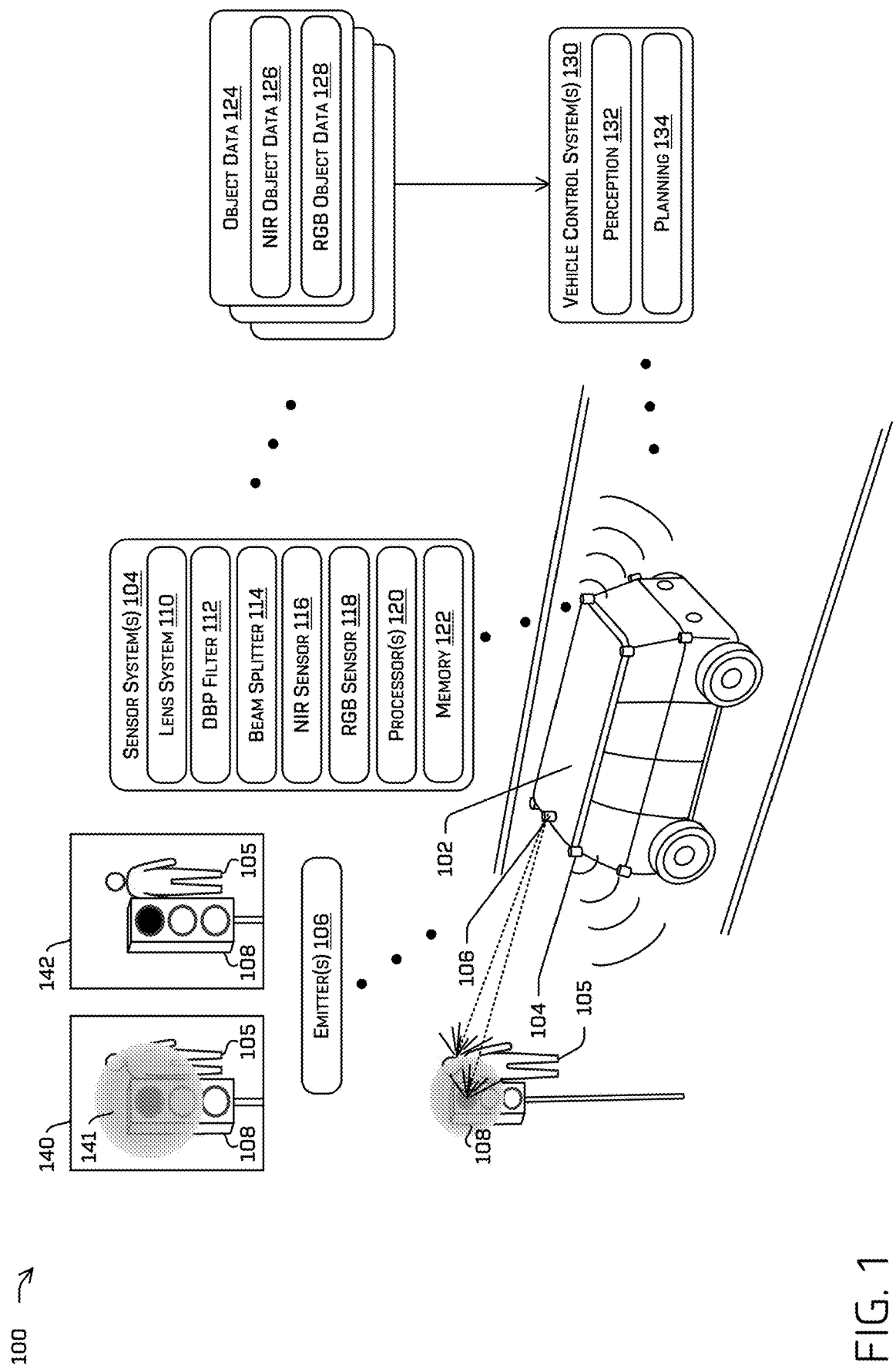
FIG. 1 illustrates an example environment and components of a vehicle, in accordance with examples of the disclosure.

Methods, apparatuses, and systems for detecting objects near a light source that may be partially or completely obscured by stray light effects are discussed herein. In some examples, stray light effects may be caused by one or more lenses through which visible light may be received by a visible light sensor, such as a red, green, blue (RGB) sensor. Stray light effects may partially or completely obscure one or more objects located proximate to a source of the visible light passing through a lens system, especially when a light source is relatively brighter than the ambient light. For example, a traffic light emitting light at night may, when viewed through a lens, result in stray light effects that appear as a "halo" around the traffic light that obscure housing of the light and/or other nearby objects. A visible light sensor configured on the vehicle that receives visible light from a lens system, including associated stray light effects, may not fully detect objects obscured by such stray light effects, and may therefore generate incomplete and/or unreliable object and environmental data. The lack of complete and accurate environmental and/or object data may inhibit the safe operation of the vehicle. The methods, apparatuses, and systems described herein may, in some instances, result in a better understanding of the environment of the vehicle, thereby leading to safer and/or more confident controlling of the vehicle.

As discussed herein, sensor data can be captured by one or more visible light (e.g., red, green, blue (RGB)) sensors and one or more other non-visible light (e.g., near-infrared (NIR)) sensors integrated within, or separate from, a computing device of a vehicle. Such sensors may receive light through one or more lens systems that may be configured with one or more integrated lenses. In various examples, the computing device may include one or more emitters to emit a signal (e.g., NIR light, other non-visible light, a particular spectra of light, etc.) and a sensor to sense a return signal (e.g., reflected NIR light, other non-visible light, etc.) from the environment. Further, the computing device can comprise a sensor computing device to determine a data format of the captured sensor data. This data format may include integrated visible and non-visible light data.

In examples, the sensing systems described herein may be configured to detect any one or more of various types of non-visible light, such as, but not limited to, NIR light, infrared light, airglow/nightglow, etc. For example, non-visible light sensors may include sensors configured with detectors that may detect the faint luminescence caused by the selective absorption by air molecules and/or atoms of solar ultraviolet and/or X-radiation, which is commonly referred to as "airglow" or "nightglow." Such detectors may be configured to detect one or more spectra in the 590-700 nm wavelength range. In various examples, non-visible light sensors may include indium gallium arsenide (InGaAs) detectors (e.g., InGaAs-based photodetectors) that may, for example, detect light in the 900-1700 nm wavelength range or the 1100-1700 nm wavelength range.

In implementations described herein, a vehicle may be configured with one or more emitters that emit non-visible light, such as NIR light in the 900-980 nm wavelength range. Such emitters may be dedicated to emitting non-visible light for use in detecting dark objects fully or partially obscured by stray light effects the using non-visible light sensors described herein. Alternatively, or in addition, such emitters may be integrated within one or more systems that may also perform other functions. For example, one or more such emitters may be configured in a light detection and ranging (LIDAR) system configured on a vehicle. Such emitters may be configured to operate continuously or may be configured to operate when likely to be needed, such as when environmental conditions increase the likelihood that stray light effects will be generated (e.g., low light conditions, nighttime, etc.).

In various examples, a vehicle may also, or instead, be configured with a visible light sensor and a non-visible light sensor that receive light through a lens system. Before transmission to such sensors, light entering the lens system from the environment may be passed through a dual bandpass filter (DBPF). A DBPF may be an optical filter configured with two passbands that pass two ranges of light spectra. A DBPF may also be referred to as a dual passband filter. Alternatively, or in addition, light may pass through a DBPF before entering the lens system. A first surface of the DBPF may be configured with a passband for visible light spectra (e.g., 400-700 nm) that may transmit a substantial portion (e.g., 95% or more) of such spectra. The first surface of the DBPF may also be configured with a relatively narrower passband for non-visible light spectra (e.g., NIR, 900-980 nm, etc.) a substantial portion (e.g., 95% or more) of such spectra. A second surface of the DBPF may be configured with broadband anti-reflective (AR) coating (e.g., covering 400-1000 nm).

The light passing through the DBPF may have significant visible and non-visible spectral components that can be directed to a beam splitter configured to direct such light components to the appropriate sensor. In various examples, the beam splitter may be configured with a non-visible light cutoff filter (e.g., infrared cutoff filter (IRCF), near-infrared cutoff filter, etc.) on a first surface and an AR coating on a second surface. The non-visible light cutoff filter may be configured with a passband for visible light spectra (e.g., 400-700 nm) that may transmit a substantial portion (e.g., 95% or more) of such spectra through the beam splitter to a visible light sensor (e.g., RGB sensor). The beam splitter may be configured with a substantially high reflectance for spectra outside the visible light spectra and may reflect the received non-visible light to a non-visible light sensor (e.g., NIR sensor).

Using the light received from or through the beam splitter, the visible light sensor and the non-visible light sensors may generate sensor data that can be used by the computing device of the vehicle as environmental and/or object data. In implementations described herein, the non-visible light sensor data may be used to detect objects and features within the environment that may not be fully represented in the visible light sensor data because such objects and features may have been fully or partially obscured by stray light effects in the visible light received at the visible light sensor. Stray light effects may be introduced in visible light that is in high contrast to the ambient light level, such as a bright light emitted by a light source at night. These stray light effects may be the result of reflection, refraction, and/or scattering introduced by one or more lenses of the lens system. Because the stray light effects do not substantially affect non-visible light, the non-visible light sensor data may be used, in combination with or instead of the visible light data, to generate complete and accurate environmental and/or object data that may improve the safe operation of the vehicle.

The systems and techniques described herein may be directed to leveraging sensor and perception data to enable a vehicle, such as an autonomous vehicle, to navigate through an environment while circumventing objects in the environment. The systems and techniques described herein can utilize information sensed about the objects in the environment, e.g., by a non-visible light sensor, to more accurately determine features of the objects. By capturing image data using visible and non-visible light, object features can fully identified, even in low light conditions For example, techniques described herein may be faster and/or more robust than conventional techniques, as they may increase the reliability of object and feature identification, reducing the likelihood of failing to identify or misidentifying an object or feature. That is, techniques described herein provide a technological improvement over existing object and feature detection, classification, prediction and/or navigation technology. In addition to improving the accuracy with which sensor data can be used to determine objects and correctly characterize such objects, the systems and techniques described herein can provide a smoother ride and improve safety outcomes by, for example, more accurately providing safe passage to an intended destination, while ensuring that no pedestrians or obstacles are otherwise obscured by stray light such that the vehicle can safely navigate in their presence.

The systems and techniques described herein can be implemented in a number of ways. Example implementations are provided below with reference to the following figures. Although applicable to vehicles, the methods, apparatuses, and systems described herein can be applied to a variety of systems and are not limited to vehicles. For example, the systems and techniques described herein can be utilized in an aviation or nautical context, or in any system configure to input data to determine data associated with objects in an environment. Additionally, the techniques described herein can be used with real data (e.g., captured using sensor(s)), simulated data (e.g., generated by a simulator), or any combination of the two.

FIG. 1 illustrates an example environment and components of a vehicle, in accordance with examples of the disclosure. The example vehicle 102 may be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first longitudinal end of the vehicle 102 is the front end of the vehicle 102, and an opposite, second longitudinal end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. In examples, the sensor system(s) 104 may include on or more visible light sensors, such as RGB sensor 118 and one or more non-visible light sensors, such as NIR sensor 116. In other examples, the sensor system(s) 104 may also, or instead, include one or more time-of-flight (ToF) sensors, LIDAR sensors, RADAR sensors, SONAR (ultrasonic) sensors, image sensors, audio sensors, infrared sensors, location sensors, etc., or any combination thereof. Certain implementations described herein may be particularly well-suited for use with a combination of one or more RGB sensors and one or more NIR sensors, although other types of sensors also are contemplated. The sensor system(s) 104 may be disposed to capture sensor data associated with the environment. For example, the sensor data may be processed by a vehicle controller, such as vehicle control system 130, to identify and/or classify one or more objects in the environment, e.g., traffic signals, traffic lights, vehicle lights, other types of lights, trees, vehicles, pedestrians, buildings, road surfaces, signage, barriers, road marking, or the like and/or to navigate the vehicle 102 relative to such object(s). In some examples, the object(s) can include a traffic light (e.g., an object 108) and a pedestrian (e.g., pedestrian 105).

As also illustrated in FIG. 1, the sensor system(s) 104 can include one or more processors 120 and memory 122 communicatively coupled to the processor(s) 120. The memory 122 can store and provide processor-executable instructions to the processor(s) 120 to cause the sensor system(s) 104 to perform functions to detect objects in when stray light effects are present in the visible light spectrum, generate image and object data, and/or correct the data to remove the impact of the stray light effects, as detailed herein. The processor(s) 120 and/or the memory 122 may be physically integrated into the sensor system(s) 104, e.g., as an SoC, FPGA, ASIC, or the like, or, in some implementations, the processor(s) 120 and/or the memory 122 may be available to, e.g., connected to receive signals from and/or send signals to, the sensor system(s) 104. As discussed herein, the sensor system(s) 104 can determine the sensor data in various formats (e.g., as NIR data, as RGB data, as combined NIR/RGB data, etc.) using the processor(s) 120.

In the example of FIG. 1, the sensor system(s) 104 may include a lens system 110 through which one or more signals from the environment may be received. This signal(s) may be passed through a dual band-pass filter (DBPF) 112 configured at the sensor system(s) 104 as described herein. The signal(s) filtered by the DBPF 112 may be provided to a beam splitter 114 configured at the sensor system(s) 104 that may provide portions of the filtered environmental signal(s) to the NIR sensor 116 and/or the RGB sensor 118 as described herein. For example, the DBPF 112 may filter the received environmental signals to remove signal components other than NIR and RGB components and pass the NIR and RGB components to the beam splitter 114 that may then reflect the NIR component of the signal to the NIR sensor 116 and pass the RGB component of the signal to the RGB sensor 118. The sensors 116 and 118 may generate sensor data that can be used by the processor(s) 120 to perform functions to detect objects (e.g., when stray light effects are present in the visible light spectrum) and generate image and object data that can then be used to control the vehicle 102. For example, using the sensor data, the sensor system(s) 104 can determine object data 124 that may include one or both of NIR object data 126 and RGB object data 128 that can then be provided to a vehicle controller, such as vehicle control system(s) 130, to control the vehicle 102.

The vehicle 102 may be configured with one or more emitters 106. The emitter(s) 106 may be a non-visible light emitter of any type. In some examples, the emitter(s) 106 may be integrated into the sensor system(s) 104, while in other examples the emitter(s) 106 may be a component of the vehicle 102 separate from the sensor system(s) 104. In certain examples, the emitter(s) 106 may be a NIR emitter. In other examples, the emitter(s) 106 may be a component of a LIDAR system that emits NIR and/or other non-visible light. The emitter(s) 106 can include multiple emitters that emit non-visible light in multiple directions. In examples, the emitter(s) 106 emits a first signal that may include non-visible light towards objects in the environment, for example, object 108 and pedestrian 105. In various examples, such emissions may be based at least in part on determining whether there is stray light detected in at least one image sensor.

As also illustrated in FIG. 1, the sensor system(s) 104 may be configured to output the sensor data (e.g., non-visible sensor data, visible sensor data, and/or related data) as object data 124. The object data 124 may be include one or more detections (e.g., one or more bounding boxes, one or more detection boxes) determined or otherwise based on non-visible sensor data, such as NIR object data 126, and/or one or more detections (e.g., one or more bounding boxes) determined or otherwise based on visible sensor data, such as RGB object data 128. The object data 124 may be embodied as image frames or portions of image frames that may include data represented by pixel data (e.g., using a 4×4 pixel format and/or a 2×2 pixel format as described herein). The object data 124 can include a stream of serially generated (e.g., at a predetermined interval) image frames or portions thereof. Generally, frames may include the same type of data, e.g., data related to a values for a plurality of pixels in an image. For example, as described herein, a pixel value may be associated with a visible light value (e.g., a red, green, or blue value) or a non-visible light value (e.g., an NIR value). As illustrated in FIG. 1, the object data 124 can include NIR object data 126, RGB object data 128, and a representation of a portion of the environment 100, for example, at a corresponding sensing time.

As illustrated in FIG. 1, the sensor system(s) 104 provide the object data 124 the vehicle control system(s) 130 for use in controlling the vehicle 102. By way of non-limiting example, the vehicle control system(s) 130 can include a perception system 132 and a planning system 134. In examples, the perception system 132 may receive object data from the sensor system(s) 104 and perform one or more of object detection, segmentation, and/or classification to determine objects in the data. The planning system 134 may determine a trajectory or route for the vehicle 102, e.g., relative to objects perceived by the perception system 132 based on the data received from the sensor system(s) 104.

As noted herein, objects in the environment 100 and/or features of such objects may be partially or completely obscured by stray light effects in the visible spectrum. Such stray light effects may be visible in the RGB data 128 as a halo, flaring, or other veiling effects. In some examples, stray light effects can obscure important features of objects in an environment that may prevent the accurate perception and classification of such objects using visible light and/or data based on visible light.

An example 140 illustrates the object 108 as detected by a visible light sensor (e.g., the RGB sensor 118) via a lens system (e.g., lens system 110). As shown in this example, stray light effects 141 may obscure portions of the object 108 and the pedestrian 105. An example 142 illustrates the object 108 as detected by a non-visible light sensor (e.g., the NIR sensor 116) via a lens system (e.g., lens system 110). As shown in this example, there are no (or minimal) stray light effects present in the non-visible light spectra, and therefore all portions of the object 108 and the pedestrian 105 are detected. Techniques described herein can improve the perception and classification of objects potentially obscured by stray light effects by using non-visible light and/or data based on non-visible light to more accurately detect features of such objects in the environment.

Providing the vehicle control system(s) 130 with object data that includes both visible light-based object data and non-visible light-based object data from the sensor system(s) 104 can improve safety outcomes, e.g., relative to providing the vehicle control system(s) 130 with visible light-based object data that may be based on incomplete object feature detection due to stray light effects while not also providing non-visible light-based object data that is not impacted by stray light effects.

Figure 2:
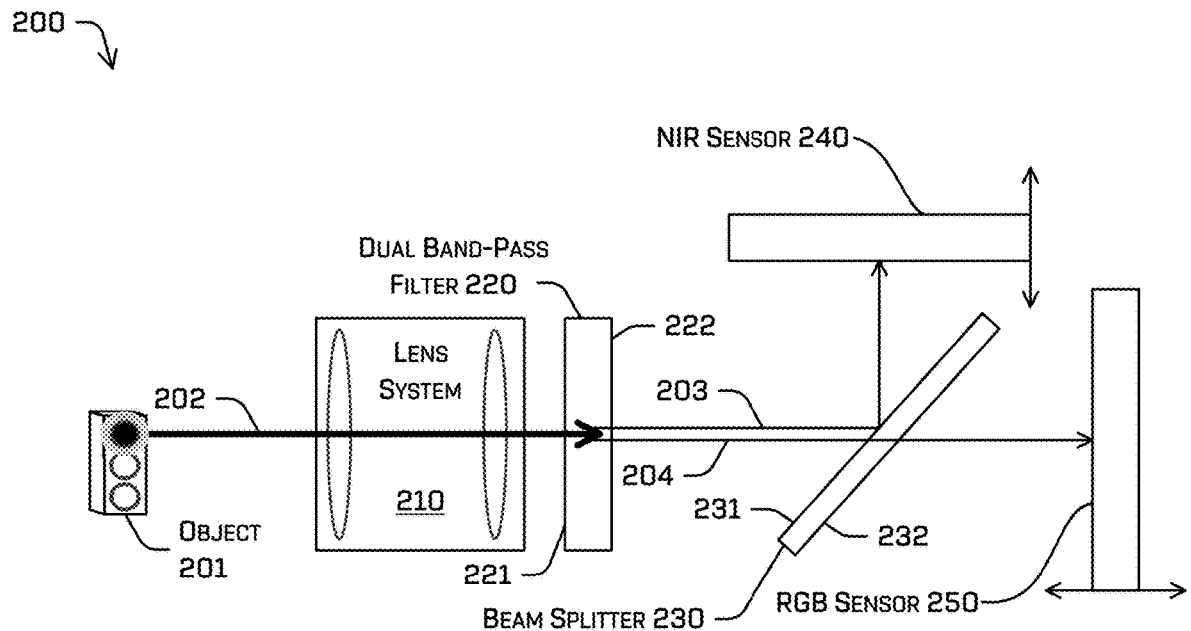
FIG. 2 depicts a block diagram of an example sensing system for detecting objects obscured by stray light effects, in accordance with examples of the disclosure.

FIG. 2 is a block diagram of an example sensing system 200. In examples, the sensing system 200 may include a lens system 210, a DBPF 220, a beam splitter 230, an NIR sensor 240, and an RGB sensor 250. In various examples, the lens system 210 may include one or more lenses. The one or more lenses may or may not be optimized or "corrected" (e.g., individually or in combination with one or more other lenses) for one or more spectra of light.

The DBPF 220 may be configured to receive and filter a signal 202 originating at an object 201 and passed through the lens system 210. Alternatively, or in addition, the DBPF 220 may be configured before the lens system 210 and may receive and filter the signal 202 originating at an object 201 before passing the filtered signals 203 and 204 to the lens system 210. A surface 221 of the DBPF 220 may be configured with a passband for visible light spectra (e.g., 400-700 nm) that may transmit a substantial portion (e.g., 95% or more) of such spectra as a visible light signal 204. The surface 221 of the DBPF 220 may also be configured with another, relatively narrower, passband for non-visible light spectra (e.g., NIR, 900-980 nm, etc.) that may transmit a substantial portion (e.g., 95% or more) of such spectra as a non-visible light signal 203. In examples, these filters may be configured on the surface 221 of the DBPF 220 as one or more coatings. A surface 222 of the DBPF 220 may be configured with a broadband AR coating that reflects light outside of a relatively broad range of light that includes both visible and non-visible light (e.g., 400-1000 nm). The AR coating on the surface 222 of the DBPF 220 may have a low reflectance within this range of light (e.g., below 1%, below 0.5%, etc.).

The non-visible light signal 203 and the visible light signal 204 may pass through the DBPF to a beam splitter 230. A surface 231 of the beam splitter 230 may be configured with a non-visible light cutoff filter (e.g., infrared cutoff filter (IRCF), near-infrared cutoff filter, etc.), for example as a coating on the surface 231. A surface 232 of the beam splitter 230 may be configured with an AR coating. The non-visible light cutoff filter on the surface 231 may be configured with a passband (e.g., a broadband passband) for visible light spectra (e.g., 400-700 nm) that may pass a substantial portion (e.g., 95% or more) of such spectra through the beam splitter to the RGB sensor 250. For example, the beam splitter 230 may transmit the visible light signal 204 to the RGB sensor 250. The AR coating on the surface 232 of the beam splitter 230 may be configured with a substantially high reflectance for spectra outside the visible light spectra, thereby reflecting received non-visible light to the NIR sensor 240. For example, the beam splitter 230 may reflect the non-visible light signal 203 to the NIR sensor 240. In various examples, the NIR sensor 240 may be a sensor configured to detect any type and/or spectra of non-visible light and/or the RGB sensor 250 may be a sensor configured to detect any type and/or spectra of visible light.

In examples, light originating at (or otherwise associated with) an object 201 in an environment may be received as the signal 202 by the sensing system 200. The signal 202 may contain visible and non-visible light. At least a portion of the non-visible light in the signal 202 may be non-visible light emitted by an emitter configured at a vehicle at which the sensing system 200 is also configured and reflected back to the sensing system 200 by the object 201. At least a portion of the visible light in the signal 202 may be visible light emitted by the object 201 (e.g., light emitted by a traffic light or any other source of light). The signal 202 may be passed through the lens system 210 and filtered by the DBPF 220 into the non-visible light signal 203 and the visible light signal 204. The signals 203 and 204 may be split by the beam splitter 230 as described herein and provided to the NIR sensor 240 and the RGB sensor 250, respectively.

Stray light effects may be introduced into the visible light portion of the signal 202 by the lens system 210. The stray light effects may be propagated into the visible light signal 204. Because such effects may obscure features of the object 201 in visible light, the RGB sensor 250 may not be able to completely detect the features of the object. However, because stray light effects may be minimal or nonexistent in non-visible light spectra (e.g., infrared, NIR, etc.), the features of the object 201 that are obscured in visible light may be detected in the non-visible light signal 203 by the NIR sensor 240.

Figure 4:
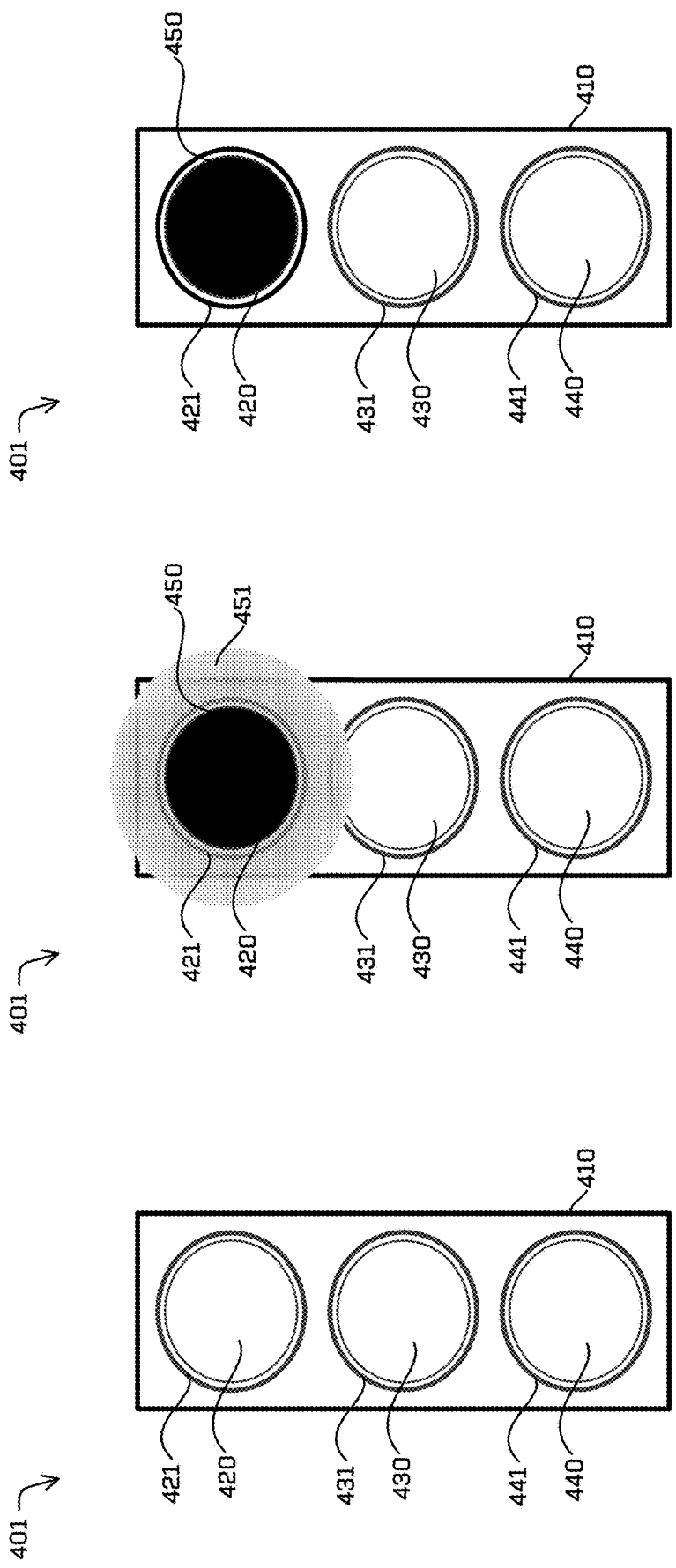
FIG. 4A is a diagrammatic representation of a light source, in accordance with examples of the disclosure.
FIG. 4B is another diagrammatic representation of a light source, in accordance with examples of the disclosure.
FIG. 4C is another diagrammatic representation of a light source, in accordance with examples of the disclosure.

The intensity of non-visible light may be much lower than the intensity of visible light in various light conditions, such as low light conditions or at night. For example, in a nighttime driving scenario, light sources such as traffic lights, streetlights, car headlights, etc., may emit visible light. The images of such emitters (e.g., primary images of the emitter itself) may indicate light of a substantially high intensity. The resulting stray light effects generated in a lens system by this high intensity light (e.g. halos surrounding the primary images) may therefore also have an intensity high enough to obscure dark objects proximate to the emitters, such as the housing or other features of a traffic light, pedestrians, etc. (e.g., the pedestrian 105 of FIG. 1 and the housing 410 and features 421 and 431 of FIG. 4). However, the intensity of the non-visible light received by a sensing system (e.g., reflected by objects in the environment) may have a relatively lower intensity, and therefore any stray light effects generated by such non-visible light by a lens system may have a correspondingly low intensity, and therefore insufficient to obscure features or objects in the environment.

The focal lengths of the spectra included in the non-visible light signal 203 may differ from the focal lengths of the spectra included in the visible light signal 204. Therefore, the optimal distance from the exit (e.g., final, last, etc.) lens surface of the lens system 210 for the NIR sensor 240 may be different than the optimal distance from exit lens surface of the lens system 210 for the RGB sensor 250. This distance from the final or last lens in a lens system to a sensor may be referred to as a "back focal length" (BFL). In examples, the position of the NIR sensor 240 and the RGB sensor 250 may be adjustable and/or different, as indicated by the arrows shown with such sensor in FIG. 2. This flexibility allows for individual positioning of each the sensors based on the focal lengths of the spectra that the sensor is intended to detect. This flexibility of sensor positioning also allows for the use of simpler and less costly lenses that may not be optimized for use with infrared and/or near-infrared light (e.g., IR corrected lenses).

The sensing system 200 also improves the detection of various objects and features in an environment (e.g., the object 201) by more cleanly separating the visible and non-visible portions of the signal 202 before providing such portions to their respective intended sensors, thereby preventing contamination of the visible portion of the light signal by the non-visible portion and vice-versa and improving the resolution of images generated using associated sensor data.

Figure 3:
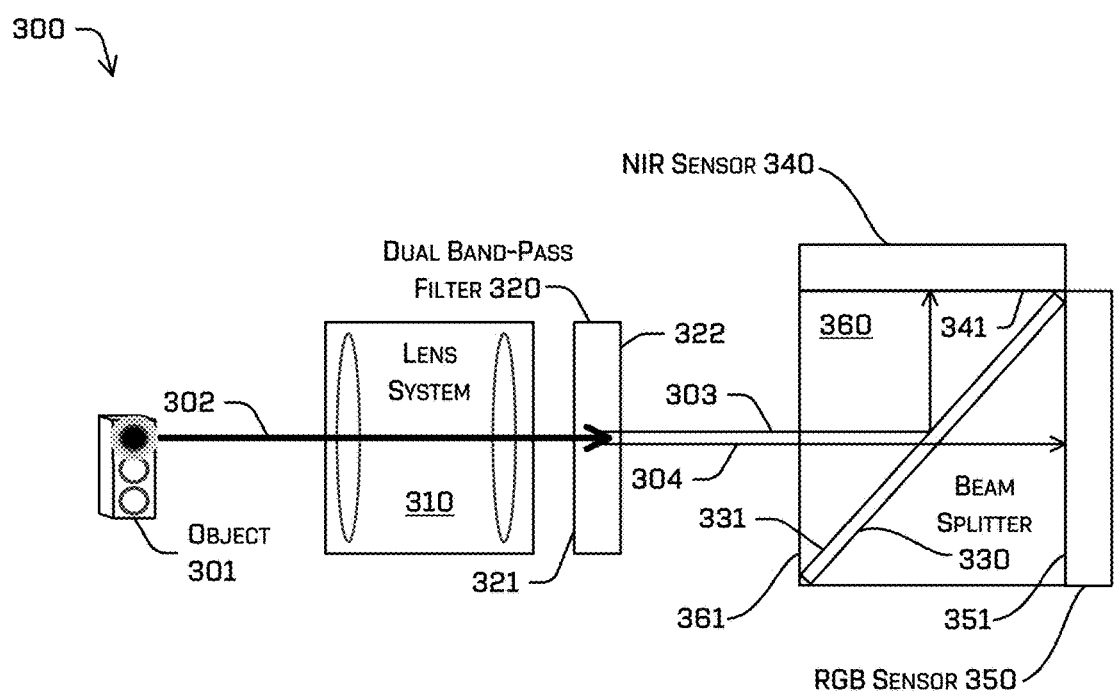
FIG. 3 depicts a block diagram of another example sensing system for detecting objects obscured by stray light effects, in accordance with examples of the disclosure.

In some implementations, a sensing system may use fixed position sensors and/or sensors that have a same BFL. FIG. 3 is a block diagram of an example sensing system 300. The sensing system 300 may include a lens system 310, a DBPF 320, and a monolithic sensor package 360. The sensor package 360 may be configured with a beam splitter 330, an NIR sensor 340, and an RGB sensor 350. When configured in the monolithic sensor package 360, the beam splitter 330, the NIR sensor 340, and the RGB sensor 350 may be affixed within the package 360. In various examples, the lens system 310 may include one or more lenses. The one or more lenses may be optimized or "corrected" (e.g., individually or in combination with one or more other lenses) for one or more spectra of light. For example, the lenses of the lens system 310 may be optimized for visible and NIR light so that the wavelengths of the visible light and the NIR light converge at approximately the same focal point. The lenses of the lens system 310 may also, or instead, be optimized for visible and NIR light to mitigate chromatic aberrations.

The DBPF 320 may be configured to intercept and filter a signal 302 received from an object 301 via the lens system 310. Alternatively, or in addition, the DBPF 320 may be configured before the lens system 310 and may receive and filter the signal 302 originating at an object 301 before passing the filtered signals 303 and 304 to the lens system 310. A surface 321 of the DBPF 320 may be configured with a passband for visible light spectra (e.g., 400-700 nm) that may transmit a substantial portion (e.g., 95% or more) of such spectra as a visible light signal 304. The surface 321 of the DBPF 320 may be configured with a relatively narrower passband for non-visible light spectra (e.g., NIR, 900-980 nm, etc.) that may transmit a substantial portion (e.g., 95% or more) of such spectra as a non-visible light signal 303. These filters may be implanted as coatings on the surface 321 of the DBPF 320. A broadband AR coating may be applied to a surface 322 of the DBPF 320 that may reflect light outside of a broad range of light that includes both visible and non-visible light (e.g., 400-1000 nm) while maintaining a low reflectance within this range of light (e.g., below 1%, below 0.5%, etc.).

The non-visible light signal 303 and the visible light signal 304 may pass through the DBPF 320 into the sensor package 360 and to the beam splitter 330 configured within the sensor package 360. A surface 331 of the beam splitter 330 may be configured with a non-visible light cutoff filter (e.g., IRCF, near-infrared cutoff filter, etc.), for example as a coating on the surface 331. The non-visible light cutoff filter on the surface 331 may be configured with a passband for visible light spectra (e.g., 400-700 nm) that may pass a substantial portion (e.g., 95% or more) of the visible light signal 304 through the beam splitter to the RGB sensor 350 configured within the sensor package 360. The surface 331 may be configured with a substantially high reflectance for spectra outside the visible light spectra, thereby reflecting the non-visible light signal 303 to the NIR sensor 340.

A surface 341 of the NIR sensor 340 configured in the sensor package 360 may be coated with an AR coating, as may be surface 351 of the RGB sensor 350 configured in the sensor package 360. The surface 361 of the sensor package 360 may also be coated with an AR coating. In various examples, the NIR sensor 340 may be a sensor configured to detect any type and/or spectra of non-visible light and/or the RGB sensor 350 may be a sensor configured to detect any type and/or spectra of visible light.

Stray light effects may be mitigated in the sensing system 300 in a similar manner as in sensing system 100. For example, light originating at an object 301 in an environment may be received as the signal 302 that includes visible and non-visible light. A portion of the non-visible light in the signal 302 may be non-visible light emitted by an emitter configured at a vehicle at which the sensing system 300 is also configured and reflected by the object 301, while a portion of the visible light in the signal 302 may be visible light emitted by the object 301 (e.g., light emitted by a traffic light or any other source of light). The signal 302 may pass through the lens system 310 to the DBPF 320 to be filtered into the non-visible light signal 303 and the visible light signal 304. The signals 303 and 304 may be split and provided to sensors 340 and 350 in the sensor package 360 by the beam splitter 330 as described above.

As described herein, stray light effects may be introduced into visible light by a lens system such as the lens system 310. Such effects may obscure features of the object 301 in visible light, preventing the RGB sensor 350 from completely detecting the features of the object 301. Therefore, the sensing system 300 may use the NIR sensor 340 to process the non-visible light signal 303 to identify features of the object 301 that may be obscured in visible light. As with sensing system 100, the sensing system 300 also improves the detection of various objects and features in an environment by more clearly separating the visible and non-visible portions of a light signal before processing by sensors.

In examples, the use of a monolithic sensor package, such as the sensor package 360, in a sensing system may reduce the effects of vibration that may be present when such a sensing system is configured on a moving platform, such as a vehicle. In a monolithic sensor package, components such as the beam splitter 330, the NIR sensor 340, and the RGB sensor 350 may be relatively firmly affixed within the package and therefore resistant to movement due to vibration and other environmental effects than components that are adjustable or less firmly affixed to a sensor system. This may help ensure that the sensors and other components in the sensor package remain properly calibrated when configured on a vehicle. Such a monolithic sensor package may also be more easily replaceable, reducing sensor system repair time and cost. A monolithic sensor package such as the sensor package 360 may also be more easily manufactured in large numbers.

FIG. 4A illustrates an example light source 401 representing a light source that may be present in an environment, such as a traffic light at an intersection. The light source 401 may include a housing 410 and emitters 420, 430, and 440 which may each be configured to emit light, for example, of a particular color (e.g., red, yellow, green). The light source 401 may be configured with emitter features 421, 431, and 441 proximate to (e.g., surrounding) each of the emitters 420, 430, and 440, respectively. The housing 410 and/or the features 421, 431, and 441 may be relatively dark in the visible light spectrum. Accurate detection of the housing 410 and/or the features 421, 431, and 441 may be provide valuable information for computer vision (CV) algorithms (e.g., artificial intelligence-based CV algorithms) that perform processes such as image classification and object detection that may be used in autonomous driving and/or advanced driver assistant systems (ADAS).

In daylight or other relatively bright ambient lighting conditions, dark features such as the housing 410 and/or the features 421, 431, and 441 may be readily identifiable in the visible light spectrum. In such lighting conditions, a visible light sensor (e.g., an RGB sensor) may readily detect and generate accurate object data for the light source 401 that a vehicle computing device may use in autonomous driving and/or ADAS processes.

At nighttime or under other lighting conditions, features and objects that are dark in the visible light spectrum and proximate to a light emitter may be obscured by stray light effects when detected though a lens system. FIG. 4B illustrates the example light source 401 in the visible light spectrum with emitter 420 activated and emitting light 450. For example, the light source 401 as shown in FIG. 4B may represent a traffic light and the emitter 420 may represent a lit red light on the traffic light at night. When detected through a lens system, the emitted light 450 may result in stray light effects 451 in the visible light spectrum. For example, the stray light effects 451 may appear in visible light as a "halo" surrounding the emitter 450.

As illustrated in this figure, the stray light effects 451 may partially or completely obscure one or more of the housing 410 and/or the features 421 and 431 in the visible light spectrum. Because these features are obscured in the visible light spectrum, a visible light sensor (e.g., an RGB sensor) may not completely and accurately detect these features and may therefore generate inaccurate and/or incomplete object data for the light source 401. This incomplete object data due to stray light effects may prevent a vehicle computing device from properly performing autonomous driving and/or ADAS processes.

Stray light effects may be minimal or nonexistent in non-visible light spectra (e.g., infrared, NIR, etc.), even when such non-visible light is detected though a lens system. FIG. 4C illustrates the example light source 401 in a non-visible light spectrum with emitter 420 activated and emitting light 450. As shown in this figure, there are no detected tray light effects in the non-visible spectrum when detected through a lens system. Therefore, in the non-visible light spectrum, the housing 410 and/or the features 421 and 431 are not obscured. Because these features are fully detectable in the non-visible light spectrum, a non-visible light sensor (e.g., an NIR sensor) may be able to fully detect these features and may therefore generate accurate and complete object data for the light source 401. This improved object data can then be used by a vehicle computing device to more accurately and efficiently perform autonomous driving and/or ADAS processes.

Figure 5:
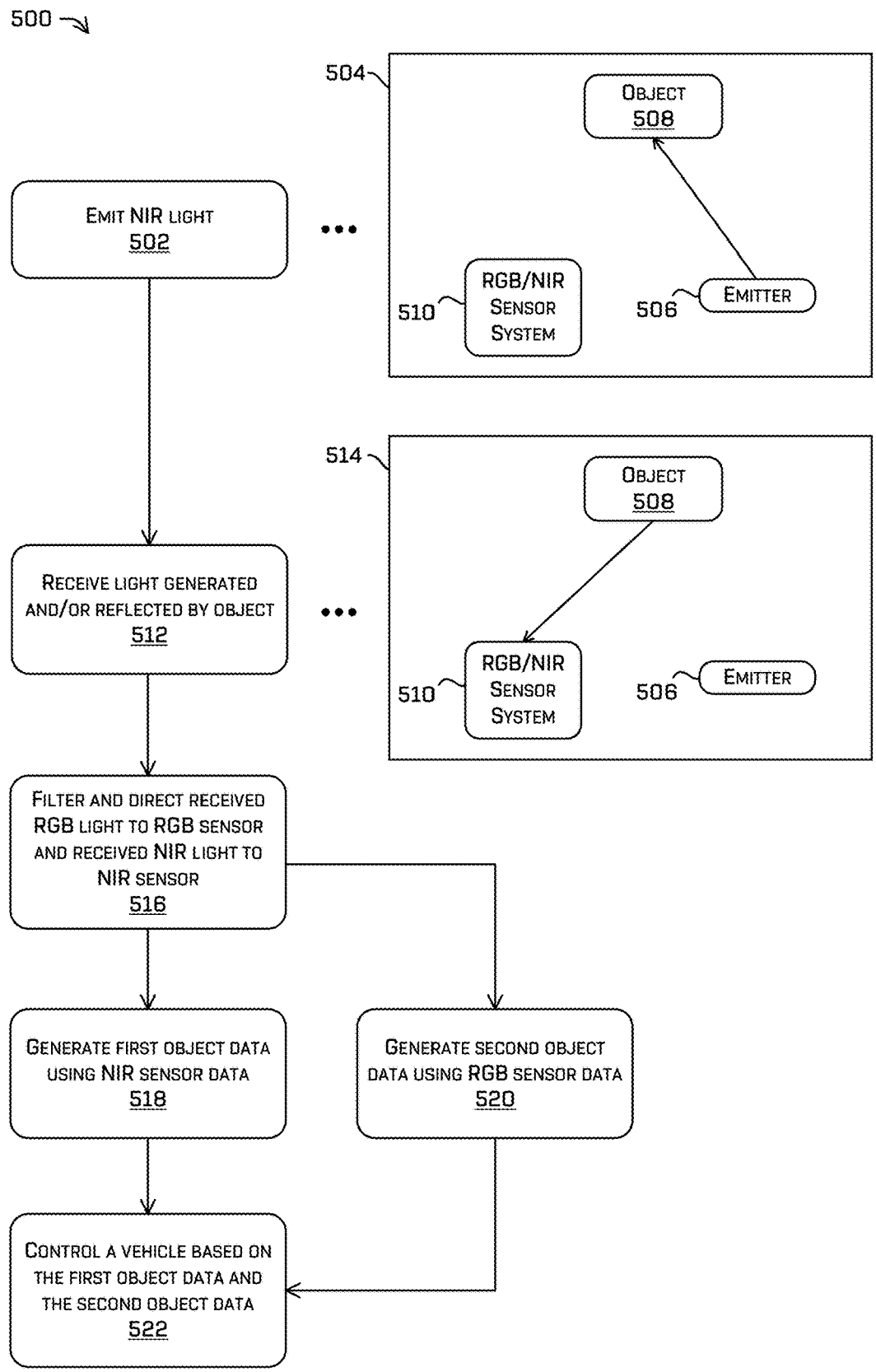
FIG. 5 is a pictorial flow diagram of an example process for detecting dark objects obscured by stray light effects, in accordance with examples of the disclosure.

FIG. 5 is a pictorial flow diagram of an example process for detecting and generating data for dark objects and features that may be obscured in the visible light spectrum due to stray light effects. In examples, a process 500 may be implemented using one or more of the components and systems illustrated in FIGS. 1, 2, 3, and 8 and described below, although the process 500 is not limited to being performed by such components and systems. Moreover, the components and systems of FIGS. 1, 2, 3, and 8 are not limited to performing the process 500.

In more detail, the process 500 can include an optional operation 502 that includes emitting non-visible light (e.g., NIR light) from an emitter and at operation 512 receiving light (e.g., visible and non-visible light) generated by an object in an environment and/or reflected by the object. An example 504 illustrates an environment including an emitter 506, and an object 508 in the environment, and an RGB/NIR sensor system 510. In examples, the emitter 506 emits a signal that includes NIR light towards objects in the environment, such as the object 508.

In some examples, at operation 502, the process 500 may determine whether to emit NIR light based on current lighting conditions in the environment. For example, a visible light sensor (e.g., RGB/NIR sensor 510) may detect current light levels, generate associated light level data, and provide such data to a vehicle computing device. The process 500 may determine whether the current light levels meet a threshold minimum level of visible light and, if not, may in response determine to emit NIR or other non-visible light. If there is sufficient visible light in the environment currently such that stray light effects are unlikely to interfere with detection of objects and features in the environment using visible light, the process 500 may determine not to emit NIR or other non-visible light.

Alternatively, or instead, the process 500 may determine whether one or more types of stray light effects (e.g., light scattering, halos, glare, reflections, refractions, etc.) are present and/or whether conditions are likely to introduce stray light effects into detected visible light. If stray light effects are detected and/or conditions are determined to be conducive to the introduction of stray light effects, the process 500 may determine to emit NIR light or other non-visible light at operation 502. If the process 500 determines that stray light effects are not present or are unlikely to affect detected visible light, the process 500 may determine not to emit NIR or other non-visible light.

In examples, machine learning (e.g., utilizing a neural network) may be used to detect and determine the conditions under which it is likely that stray light effects will occur. In response to detecting such conditions, at operation 502, the process 500 may determine whether to emit NIR light or other non-visible light using one or more machine-learned algorithms. For example, the process 500 may use lighting conditions and/or weather conditions as input to a machine-learned algorithm that determines whether to emit light based on the detected conditions.

In examples, when the process 500 has determined to emit NIR light or other non-visible light, machine learning (e.g., utilizing a neural network) may be used to determine the timing and/or duration of such emissions. For example, in response to detecting such conditions, at operation 502, the process 500 may determine when to emit NIR light or other non-visible light using one or more machine-learned algorithms. The process 500 may also, or instead, determine a pattern or duration of emitting NIR light or other non-visible light (e.g., pulsed emissions for a particular time period, repeating of emissions of a particular length of time for a particular time period, a time period between emissions, etc.) using one or more machine-learned algorithms. For example, the process 500 may use lighting conditions and/or weather conditions as input to a machine-learned algorithm that determines a timing, pattern, and/or duration of NIR light or other non-visible light emissions.

Note that the process 500, and other processes set forth herein, may be performed passively and without the active emission of light of any type. In such examples, the operation 502 may be omitted and one or more of the remaining operations of process 500 may be performed using light currently available in the environment (e.g., ambient light).

At operation 512, the process 500 may receive or otherwise detect the light from the environment, such as light generated by one or more objects in the environment (e.g., incident light) and/or light reflected by one or more objects in the environment (e.g., reflected light). An example 514 illustrates the RGB/NIR sensor system 510 receiving or detecting a signal that includes visible light generated and/or reflected by the object 508 and NIR light generated and/or reflected by the object 508.

At operation 516, the process 500 may filter the light received by at operation 512, for example as described herein in regard to FIGS. 2 and 3, into a first signal comprising visible light and a second signal comprising non-visible light. The process may then direct the visible light to a visible light sensor and the non-visible light to a non-visible light sensor. For example, the process 500 may use a DBPF to filter out all light except for RGB light and NIR light. The process 500 may direct the filtered RGB light and NIR light to a beam splitter that passes the RGB light to an RGB sensor and reflects the NIR light to an NIR sensor.

At operation 518, the process 500 may generate object data using the non-visible light sensor for use in vehicle control systems and processes. At operation 520 the process 500 may generate object data using the visible light sensor for use in vehicle control systems and processes. For example, an NIR sensor may generate NIR sensor data based on the detected NIR light associated with an object in the environment. The process 500 may then generate first object data associated with the object based on the NIR sensor data. Similarly, an RGB sensor may generate RGB sensor data based on the detected RGB light associated with the object in the environment. The process 500 may then generate second object data associated with the object based on the RGB sensor data.

At operation 522, the process 500 may include controlling a vehicle based on the first object data and/or the second object data, including by analyzing such data to determine distance, object identity, location, and/or characteristic. In some examples, one or more actions based on the first object data and/or the second object data can be determined, the action(s) including determining a vehicle operation mode, maneuvering the vehicle, stopping the vehicle, initiating movement of the vehicle, etc. However, controlling the vehicle is not limited to those actions, and the vehicle can be controlled based on other actions.

In some examples, at operation 522, the process 500 may determine whether the classification or identification of an object using visible light data (e.g., as received at operation 520) matches or otherwise corresponds to the classification or identification of the object using non-visible light data (e.g., as received at operation 518). The process 500 may then determine actions at operation 522 for controlling the vehicle based on whether, or to what extent, the determined classification or identification of an object made using non-visible light data corresponds the determined classification or identification of an object made using visible light data.

Figure 6:
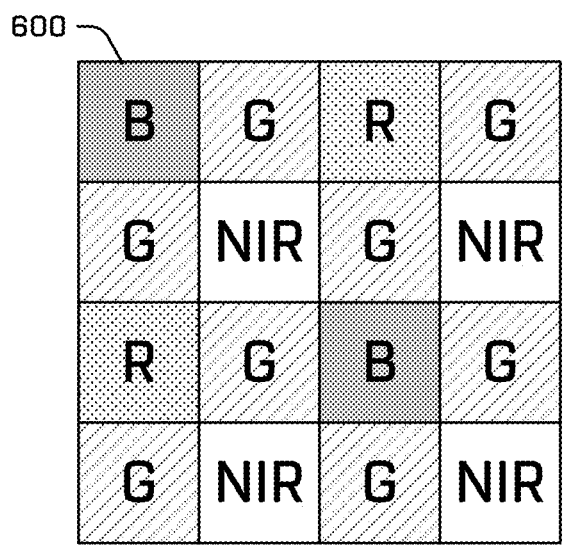
FIG. 6 is a graphical representation of an example data structure that may be used to represent pixel data, in accordance with examples of the disclosure.
Figure 7:
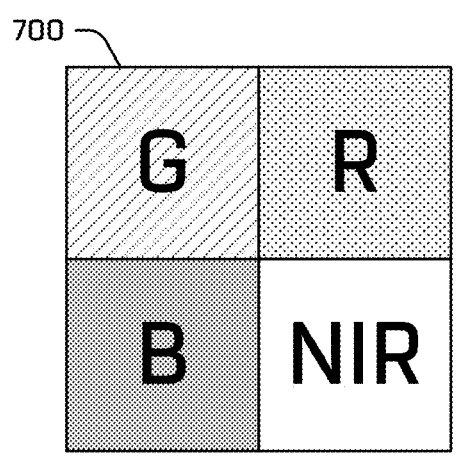
FIG. 7 is a graphical representation of another example data structure that may be used to represent pixel data, in accordance with examples of the disclosure.
Figure 8:
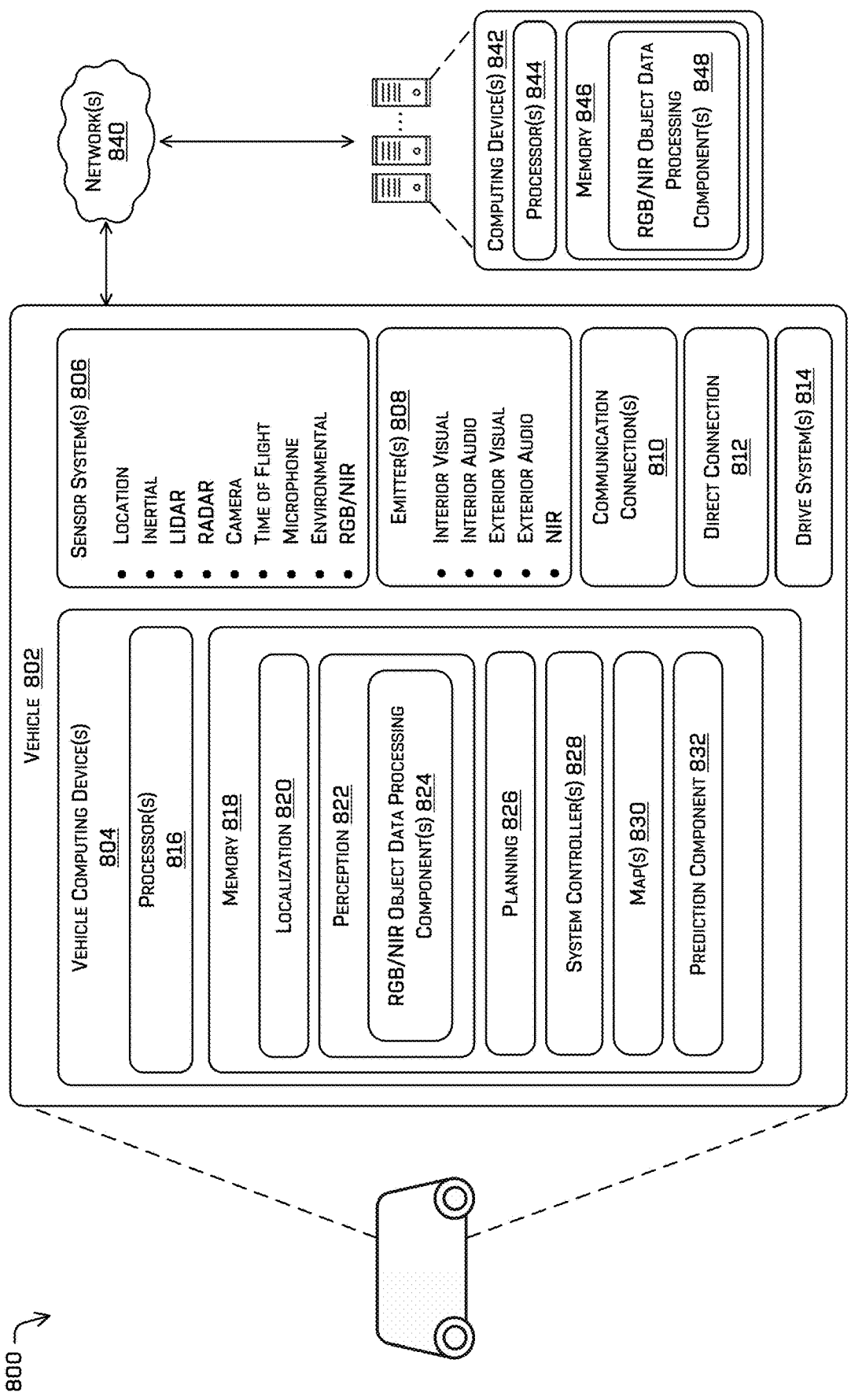
FIG. 8 depicts a block diagram of an example system for implementing the methods described herein.

FIG. 6 illustrates an example sensor 600 that may be used to detect light and generate sensor data as described herein. In examples, a sensing system may generate visible light sensor data (e.g., RGB sensor data) and non-visible light sensor data (e.g., NIR sensor data) for an image detected and/or generated by the sensing system. The sensing system may use one or more sensors such as the sensor 600 as shown in FIG. 6 to capture data for image pixels. In this example, the system may use a 4×4 pixel sensor 600, where the sensor 600 captures 16 pixels of data, with red data captured by two pixels of the sensor, green data captured by eight pixels of the sensor, blue data captured by two pixels of the sensor, and NIR data captured by four pixels of the sensor. Note that in other examples, other non-visible light data may be at the pixels indicated for NIR in the sensor 600. The sensor 600 provides an improved means of capturing pixel data for sensing systems described herein by capturing visible and non-visible light data in a single sensor. In such implementations, a sensing system may not use a beam splitter as described in some examples because the sensor 600 may be configured to detect both visible and non-visible light and generate corresponding pixel data. FIG. 7 illustrates another example sensor 700 that may be used detect light and generate sensor data as described herein. As described herein, a sensing system may generate visible light sensor data (e.g., RGB sensor data) and non-visible light sensor data (e.g., NIR sensor data) for an image detected and/or generated by the sensing system. The sensing system may use one or more sensors such as the sensor 700 to capture data for image pixels. In this example, the system may use a 2×2 pixel sensor 700, where the sensor 700 captures four pixels of data, with one pixel used to capture red data, one pixel used to capture green data, one pixel used to capture blue data, and one pixel used to capture NIR data. Note that in other examples, other non-visible light data may be captured by the pixels indicated for NIR in the sensor 700. The sensor 700 provides an improved means of capturing pixel data for sensing systems described herein by capturing visible and non-visible light data in a single sensor. In such implementations, a sensing system may not use a beam splitter as described in some examples because the sensor 700 may be configured to detect both visible and non-visible light and generate corresponding pixel data. FIG. 8 depicts a block diagram of an example system 800 for implementing the techniques described herein. In at least one example, the system 800 can include a vehicle 802. The vehicle 802 can include a vehicle computing device 804 that may function as and/or perform the functions of a vehicle controller for the vehicle 802. The vehicle 802 can also include one or more sensor systems 806, one or more emitters 808, one or more communication connections 810, at least one direct connection 812, and one or more drive systems 814.

The vehicle computing device 804 can include one or more processors 816 and memory 818 communicatively coupled with the one or more processors 816. In the illustrated example, the vehicle 802 is an autonomous vehicle; however, the vehicle 802 could be any other type of vehicle. In the illustrated example, the memory 818 of the vehicle computing device 804 stores a localization component 820, a perception component 822 comprising an RGB/NIR object data processing component 824, a planning component 826, one or more system controllers 828, one or more maps 830, and a prediction component 832. Though depicted in FIG. 8 as residing in memory 818 for illustrative purposes, it is contemplated that the localization component 820, the perception component 822, the RGB/NIR object data processing component 824, the planning component 826, the one or more system controllers 828, the one or more maps 830, and/or the prediction component 832 can additionally, or alternatively, be accessible to the vehicle 802 (e.g., stored remotely).

In at least one example, the localization component 820 can include functionality to receive data from the sensor system(s) 806 to determine a position and/or orientation of the vehicle 802 (e.g., one or more of an x-, y-, z-position, roll, pitch, or yaw). For example, the localization component 820 can include and/or request/receive a map of an environment and can continuously determine a location and/or orientation of the autonomous vehicle within the map. In some instances, the localization component 820 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 820 can provide data to various components of the vehicle 802 to determine an initial position of an autonomous vehicle for generating a trajectory and/or for generating map data, as discussed herein.

In some instances, the perception component 822 can include functionality to perform object detection, segmentation, and/or classification. In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 822 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some examples, the RGB/NIR object data processing component 824 can include functionality to determine features of an object that may be obscured in visible light due to stray light effects by using non-visible light data. In other examples, the RGB/NIR object data processing component 824 can include functionality to determine whether the classification or identification of an object using visible light data matches or otherwise corresponds to the classification or identification of the object using non-visible light data. In some examples, reflected non-visible light originating at the emitter(s) 808 may be used to determine non-visible light data that can then be used to identify and classify object features that may be obscured by stray light effects in the visible light data.

In general, the planning component 826 can determine a path for the vehicle 802 to follow to traverse through an environment. For example, the planning component 826 can determine various routes and trajectories and various levels of detail. For example, the planning component 826 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 826 can generate an instruction for guiding the autonomous vehicle along at least a portion of the route from the first location to the second location. In at least one example, the planning component 826 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 802 to navigate.

In at least one example, the vehicle computing device 804 can include one or more system controllers 828, which can be configured to control steering, propulsion, braking, safety, emitters, communication, and other systems of the vehicle 802. These system controller(s) 828 can communicate with and/or control corresponding systems of the drive system(s) 814 and/or other components of the vehicle 802.

The memory 818 can further include one or more maps 830 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (NIR light information, infrared light information) and the like), intensity information (e.g., LIDAR information, RADAR information, NIR light intensity information, infrared light intensity information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 830 can include at least one map (e.g., images and/or a mesh). In some examples, the vehicle 802 can be controlled based at least in part on the maps 830. That is, the maps 830 can be used in connection with the localization component 820, the perception component 822, and/or the planning component 826 to determine a location of the vehicle 802, identify objects in an environment, and/or generate routes and/or trajectories to navigate within an environment.

In some examples, the one or more maps 830 can be stored on a remote computing device(s) (such as the computing device(s) 842) accessible via network(s) 840. In some examples, multiple maps 830 can be stored based on, for example, a characteristic (e.g., type of entity, time of day, day of week, season of the year, etc.). Storing multiple maps 830 can have similar memory requirements but increase the speed at which data in a map can be accessed.

In general, the prediction component 832 can generate predicted trajectories of objects in an environment. For example, the prediction component 832 can generate one or more predicted trajectories for vehicles, pedestrians, animals, and the like within a threshold distance from the vehicle 802. In some instances, the prediction component 832 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 818 (and the memory 846, discussed below) can be implemented as a neural network.

As described herein, an example neural network is an algorithm that passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 806 can include RGB sensors, NIR sensors, LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 806 can include multiple instances of these and/or other types of sensors. For instance, the LIDAR sensors can include individual LIDAR sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the vehicle computing device 804. Additionally, or alternatively, the sensor system(s) 806 can send sensor data, via the one or more networks 840, to the one or more computing device(s) at a particular frequency, after a lapse of a predetermined period of time, in near real-time, etc.

The vehicle 802 can also include one or more emitters 808 for emitting light (visible and/or non-visible) and/or sound, as described above. The emitters 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as NIR emitters and/or LIDAR systems that include non-visible light emitters.

The vehicle 802 can also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device 804 to another computing device or a network, such as network(s) 840. For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 can include one or more drive systems 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include one or more sensor systems to detect conditions of the drive system(s) 814 and/or the surroundings of the vehicle 802. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, LIDAR sensors, RADAR sensors, etc. Some sensors, such as the wheel encoders can be unique to the drive system(s) 814. In some cases, the sensor system(s) on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 814. Furthermore, the drive system(s) 814 also include one or more communication connection(s) that enable communication by the respective drive system with one or more other local or remote computing device(s).

In at least one example, the direct connection 812 can provide a physical interface to couple the one or more drive system(s) 814 with the body of the vehicle 802. For example, the direct connection 812 can allow the transfer of energy, fluids, air, data, etc. between the drive system(s) 814 and the vehicle. In some instances, the direct connection 812 can further releasably secure the drive system(s) 814 to the body of the vehicle 802.

In some examples, the vehicle 802 can send sensor data to one or more computing device(s) 842 via the network(s) 840. In some examples, the vehicle 802 can send raw sensor data to the computing device(s) 842. In other examples, the vehicle 802 can send processed sensor data and/or representations of sensor data to the computing device(s) 842. In some examples, the vehicle 802 can send sensor data to the computing device(s) 842 at a particular frequency, after a lapse of a predetermined period of time, in near real-time, etc. In some cases, the vehicle 802 can send sensor data (raw or processed) to the computing device(s) 842 as one or more log files.

The computing device(s) 842 can include processor(s) 844 and a memory 846 storing an RGB/NIR object data processing component 848. In some instances, the RGB/ NIR object data processing component 848 can substantially correspond to the RGB/NIR object data processing component 824 and can include functionality to determine features of an object that may be obscured in visible light due to stray light effects by using non-visible light data and/or to determine whether the classification or identification of an object using visible light data matches or otherwise corresponds to the classification or identification of the object using non-visible light data.

The processor(s) 816 of the vehicle 802 and the processor(s) 844 of the computing device(s) 842 can be any suitable processor capable of executing instructions to process data and perform operations as described herein. By way of example and not limitation, the processor(s) 816 and 844 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 846 are examples of non-transitory computer-readable media. The memory 818 and 846 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in alternative examples, components of the vehicle 802 can be associated with the computing device(s) 842 and/or components of the computing device(s) 842 can be associated with the vehicle 802. That is, the vehicle 802 can perform one or more of the functions associated with the computing device(s) 842, and vice versa.

Example Clauses

A: A system comprising: a lens system comprising a plurality of lenses and defining an optical axis; a dual band-pass filter displaced along the optical axis proximate to the plurality of lenses and comprising a visible light passband and a near-infrared light passband; a beam splitter displaced along the optical axis proximate the dual band-pass filter and positioned such that at least a portion of incident light in a visible spectrum is directed to a visible light sensor and at least a portion of the incident light in a near-infrared spectrum is directed to a near-infrared light sensor, the beam splitter comprising a broadband passband filter; a processor configured to generate object data representing an object in an environment based at least in part on a signal received from the near-infrared light sensor; and a vehicle controller configured to control a vehicle based at least in part on the object data.

B: The system of paragraph A, wherein the beam splitter, the visible light sensor, and the near-infrared light sensor are configured in a monolithic sensor package.

C: The system of paragraph A or B, wherein the plurality of lenses comprises at least one lens optimized for visible light and near-infrared light.

D: The system of any of paragraphs A-C, wherein the processor is further configured to generate the object data based at least in part on a second signal received from the visible light sensor.

E: The system of any of paragraphs A-D, further comprising an emitter configured to be activated based at least in part on a condition on the environment.

F: A method comprising: detecting a condition of an environment; determining to activate an emitter based at least in part on the condition, the emitter configured to emit near-infrared light into the environment; detecting, at a sensor system, environmental light from the environment, the environmental light comprising a near-infrared light portion and a visible light portion; generating, at the sensor system, near-infrared light data based at least in part on the near-infrared light portion of the environmental light; generating, at the sensor system, visible light data based at least in part on the visible light portion of the environmental light; determining, based at least in part on the near-infrared light data and the visible light data, object data representing an object in the environment; and controlling, by a vehicle controller, a vehicle based at least in part on the object data.

G: The method of paragraph F, wherein the sensor system comprises one or more of a 4×4 pixel sensor configured to capture red, green, and blue (RGB) and near-infrared pixel data based at least in part on the environmental light; or a 2×2 pixel sensor configured to capture red, green, and blue (RGB) and near-infrared pixel data based at least in part on the environmental light.

H: The method of paragraph F or G, wherein detecting the environmental light from the environment comprises: filtering, at a dual band-pass filter, the environmental light into the near-infrared light portion of the environmental light and the visible light portion of the environmental light; receiving, at a near-infrared light sensor from the dual band-pass filter, the near-infrared light portion of the environmental light, wherein the near-infrared light sensor is configured to generate the near-infrared light data based at least in part on the near-infrared light portion of the environmental light; and receiving, at a visible light sensor from the dual band-pass filter, the visible light portion of the environmental light, wherein the visible light sensor is configured to generate the visible light data based at least in part on the visible light portion of the environmental light.

I: The method of any of paragraphs F-H, wherein the near-infrared light portion of the environmental light comprises at least a portion of the near-infrared light emitted by the emitter that is reflected from one or more surfaces in the environment.

J: The method of any of paragraphs F-I, wherein the emitter is a component of a Light Detection and Ranging (LIDAR) system.

K: The method of any of paragraphs F-J, wherein detecting the condition of the environment comprises detecting a light level of the environment based at least in part on the environmental light.

L: The method of any of paragraphs F-J, wherein determining to activate the emitter comprises using a machine-learned model to determine to activate the emitter based at least in part on the condition.

M: The method of paragraph L, wherein using the machine-learned model to determine to activate the emitter comprises detecting stray light effects based at least in part on the visible light data.

N: The method of any of paragraphs F-J, wherein generating the object data comprises detecting the object in the environment based at least in part on the near-infrared light data and not based on the visible light data.

O: A system comprising: a lens system comprising a plurality of lenses and defining an optical axis; a dual band-pass filter displaced along the optical axis proximate to the plurality of lenses and comprising a visible light passband and a non-visible light passband; a beam splitter displaced along the optical axis proximate the dual band-pass filter and positioned such that at least a portion of incident light in a visible light spectrum is directed to a visible light sensor and at least a portion of the incident light in a non-visible light spectrum is directed to a non-visible light sensor; and a processor configured to generate object data representing an object in an environment based at least in part on a signal received from the non-visible light sensor.

P: The system of paragraph O, wherein the beam splitter comprises an anti-reflective coating configured to pass the portion of the incident light in the visible light spectrum to the visible light sensor.

Q: The system of paragraph O or P, wherein the beam splitter is configured to reflect the portion of the incident light in the non-visible light spectrum to the non-visible light sensor.

R: The system of any of paragraphs O-Q, wherein the beam splitter, the visible light sensor, and the non-visible light sensor are configured in a monolithic sensor package.

S: The system of any of paragraphs O-R wherein the system further comprises an emitter configured to emit non-visible light into the environment based at least in part on a condition of the environment.

T: The system of paragraph S, wherein the processor is further configured to activate the emitter based at least in part on a machine-learned model and the condition of the environment.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
a lens system comprising a plurality of lenses and defining an optical axis;
a dual band-pass filter displaced along the optical axis proximate the plurality of lenses and comprising a visible light passband and a near-infrared light passband;
a beam splitter displaced along the optical axis proximate the dual band-pass filter and positioned such that at least a portion of incident light in a visible spectrum is directed to a visible light sensor and at least a portion of the incident light in a near-infrared spectrum is directed to a near-infrared light sensor, the beam splitter comprising a broadband passband filter;
a processor configured to generate object data comprising:
a first subset of the object data
representing an object in an environment based at least in part on a first signal received from the near-infrared light sensor, and
a second subset of the object data representing the object in the environment based at least in part on a second signal received from the visible light sensor, wherein the first subset of the object data represents a first feature of the object that is unrepresented in the second subset of the object data; and
a vehicle controller configured to control a vehicle based at least in part on the object data.

2. The system of claim 1, wherein the beam splitter, the visible light sensor, and the near-infrared light sensor are configured in a monolithic sensor package.

3. The system of claim 1, wherein the plurality of lenses comprises at least one lens optimized for visible light and near-infrared light.

4. The system of claim 1, wherein the first feature of the object is obscured in the visible spectrum by stray light effects in the visible spectrum.

5. The system of claim 1, further comprising an emitter configured to be activated based at least in part on a condition on the environment.

6. A system comprising:
a lens system comprising a plurality of lenses and defining an optical axis;
a dual band-pass filter displaced along the optical axis proximate to the plurality of lenses and comprising a visible light passband and a non-visible light passband;
a beam splitter displaced along the optical axis proximate to the dual band-pass filter and positioned such that at least a portion of incident light in a visible light spectrum is directed to a visible light sensor and at least a portion of the incident light in a non-visible light spectrum is directed to a non-visible light sensor; and
a processor configured to generate object data comprising:
a first subset of the object data
representing an object in an environment based at least in part on a first signal received from the non-visible light sensor, and
a second subset of the object data representing the object in the environment based at least in part on a second signal received from the visible light sensor, wherein the first subset of the object data represents a first feature of the object that is unrepresented in the second subset of the object data.

7. The system of claim 6, wherein the beam splitter comprises an anti-reflective coating configured to pass the portion of the incident light in the visible light spectrum to the visible light sensor.

8. The system of claim 6, wherein the beam splitter is configured to reflect the portion of the incident light in the non-visible light spectrum to the non-visible light sensor.

9. The system of claim 6, wherein the beam splitter, the visible light sensor, and the non-visible light sensor are configured in a monolithic sensor package.

10. The system of claim 6, wherein the system further comprises an emitter configured to emit non-visible light into the environment based at least in part on a condition of the environment.

11. The system of claim 10, wherein the processor is further configured to activate the emitter based at least in part on a machine-learned model and the condition of the environment.

* * * * *